(12) United States Patent
Strobl

(10) Patent No.: US 11,719,147 B2
(45) Date of Patent: Aug. 8, 2023

(54) EXHAUST GAS AFTER-TREATMENT SYSTEM OF AN ENGINE DESIGNED AS GAS ENGINE OR DUAL-FUEL ENGINE, ENGINE AND METHOD FOR OPERATING THE SAME

(71) Applicant: MAN Energy Solutions SE, Augsburg (DE)

(72) Inventor: Klaus Strobl, Inchenhofen (DE)

(73) Assignee: MAN ENERGY SOLUTIONS SE, Augsburg (DE)

( * ) Notice: Subject to any disclaimer, the term of this patent is extended or adjusted under 35 U.S.C. 154(b) by 0 days.

(21) Appl. No.: 17/986,857

(22) Filed: Nov. 14, 2022

(65) Prior Publication Data
US 2023/0151753 A1     May 18, 2023

(30) Foreign Application Priority Data
Nov. 16, 2021 (DE) .......................... 102021129852.0

(51) Int. Cl.
| | | |
|---|---|---|
| *F01N 13/08* | (2010.01) | |
| *F01N 3/20* | (2006.01) | |
| *F01N 3/24* | (2006.01) | |

(52) U.S. Cl.
CPC ......... *F01N 3/2053* (2013.01); *F01N 13/087* (2013.01); *F01N 3/24* (2013.01)

(58) Field of Classification Search
CPC ...... F01N 3/031; F01N 3/0878; F01N 3/2053; F01N 13/087
See application file for complete search history.

(56) References Cited

U.S. PATENT DOCUMENTS

2011/0041482 A1 *   2/2011   Cheng ................... F01N 13/017
                                                60/288

FOREIGN PATENT DOCUMENTS

| DE | 3826364    A1 * | 2/1990 | |
| DE | 692 19 485      | 8/1997 | |
| DE | 102016216281 A1 * | 3/2018 | ........... F01N 3/0205 |
| EP | 0678153 B1      | 5/1997 | |
| EP | 2686530 B1      | 5/2019 | |

(Continued)

OTHER PUBLICATIONS

Search Report dated Jan. 17, 2023 issued in Great Britain Patent Application No. 2212168.5.

(Continued)

*Primary Examiner* — Jonathan R Matthias
(74) *Attorney, Agent, or Firm* — Cozen O'Connor

(57) ABSTRACT

The exhaust gas after-treatment system of an engine configured as a gas engine or as a dual-fuel engine includes a catalyst, that can be flowed through by exhaust gas, a control tube extending through a recess in the catalyst, which control tube is movable relative to the catalyst and is flowable through by exhaust gas, and an actuator which is equipped to move the control tube relative to the catalyst dependent on at least one operating condition of the engine and/or at least one operating condition of the exhaust gas after-treatment system such that in a first relative position of the control tube relative to the catalyst, the catalyst can be flowed through by exhaust gas but not the control tube, and in a second relative position of the control tube relative to the catalyst, the control tube can be flowed through by the exhaust gas but not the catalyst.

9 Claims, 2 Drawing Sheets

(56) References Cited

FOREIGN PATENT DOCUMENTS

| GB | 2554355 | | 4/2018 |
|----|---------|---|--------|
| KR | 20150128561 | | 11/2015 |
| KR | 20170049889 A | * | 5/2017 |
| KR | 102011647 | | 10/2019 |
| WO | WO 92/19850 | | 11/1992 |
| WO | WO 2004/053313 | | 6/2004 |

OTHER PUBLICATIONS

Office Action dated Feb. 14, 2023 issued in Finnish Patent Application No. 20225667.

* cited by examiner

EXHAUST GAS AFTER-TREATMENT SYSTEM OF AN ENGINE DESIGNED AS GAS ENGINE OR DUAL-FUEL ENGINE, ENGINE AND METHOD FOR OPERATING THE SAME

BACKGROUND OF THE INVENTION

1. Field of the Invention

The invention relates to an exhaust gas after-treatment system of an engine designed as gas engine or as dual-fuel engine. Furthermore, the invention relates to an engine designed as gas engine or dual-fuel engine and to a method for operating the exhaust gas after-treatment system or the engine.

2. Description of the Related Art

Large engines, such as are employed for example as internal combustion engines on ships, are increasingly embodied as gas engines or dual-fuel engines. In gas engines, a gaseous fuel, such as for example natural gas, is combusted. In dual-fuel engines, a gaseous fuel, such as for example natural gas, can be combusted in a gas fuel operating mode and a liquid fuel, such as for example diesel fuel, in a liquid fuel operating mode.

The exhaust gas of such large engines has to be cleaned. For this purpose, engines are equipped with exhaust gas after-treatment systems. There is a need for an exhaust gas after-treatment system of compact design of an engine designed as gas engine or dual-fuel engine, in particular of a large engine, which is preferentially employed as propulsion unit on a ship.

SUMMARY OF THE INVENTION

Starting out from this, it is an object of the invention to create a new type of exhaust gas after-treatment system of an engine configured as a gas engine or as a dual-fuel engine having such an exhaust gas after-treatment system.

This object may be solved through an exhaust gas after-treatment system having a catalyst that can be flowed through by exhaust gas.

Further, the exhaust gas after-treatment system according to the invention comprises a control tube extending through a recess in the catalyst, which control tube is movable relative to the catalyst and which can likewise be flowed through by exhaust gas.

Further, the exhaust gas after-treatment system according to the invention comprises an actuator which is equipped to move the control tube relative to the catalyst, dependent on at least one operating condition of the engine and/or at least one operating condition of the exhaust gas after-treatment system, in such a manner that in a first relative position of the control tube relative to the catalyst, the catalyst can be flowed through by exhaust gas but not the control tube, and in that in a second relative position of the control tube relative to the catalyst the control tube can be flowed through by exhaust gas but not the catalyst.

In the exhaust gas after-treatment system according to the invention the control tube is integrated in the catalyst in such a manner that the control tube penetrates a recess in the catalyst and is movable relative to the catalyst. In the first relative position of the control tube the same makes possible an exhaust gas flow through the catalyst, in the second relative position of the control tube the same prevents the exhaust gas flow through the catalyst but allows the exhaust gas flow through itself. Such an exhaust gas after-treatment system requires little installation space. Bypass tubes, insulations, flaps, rupture discs as well as control valves for the bypass tubes can be omitted.

Preferentially, the catalyst is a ring catalyst which radially inside is delimited in the region of the recess receiving the control tube by a first catalyst tube which radially outside is delimited by a second catalyst tube and/or a pressure reactor, which at a first axial end comprises a flow inlet side for exhaust gas and at a second axial end a flow outlet side for exhaust gas. Such a catalyst is particularly preferred for ensuring a compact design of the exhaust gas after-treatment system.

Preferentially, the control tube carries on a first portion a first closure body which in the first relative position of the control tube allows the flow through the catalyst and in the second relative position of the control tube prevents the flow through the catalyst. This also provides a compact design of the exhaust gas after-treatment system.

Preferentially, the control tube on a second portion carries a second closure body which in the first relative position of the control tube seals a gap between the control tube and the catalyst. In this manner, the necessary installation space of the exhaust gas after-treatment system can be advantageously reduced.

Preferentially, the control tube on a third portion comprises recesses, which are blocked in the first relative position of the control tube and are open in the second relative position of the control tube. These also reduce the installation space of the exhaust gas after-treatment system.

Preferentially, the exhaust gas after-treatment system comprises a sprayer for a regeneration agent, via which in the first relative position of the control tube relative to the catalyst and in the second relative position of the control tube relative to the catalyst a regeneration agent can be introduced into the catalyst. By way of the sprayer it is possible to introduce regeneration agent into the catalyst with compact design of the exhaust gas after-treatment system.

Preferentially, the exhaust gas after-treatment system comprises at least one sensor and a control unit to detect the at least one operating position of the engine and/or the at least one operating condition of the exhaust gas after-treatment system, and to control the actuator independently of the at least one operating condition of the engine and/or of the at least one operating condition of the exhaust gas after-treatment system. This allows a particularly advantageous operation of the exhaust gas after-treatment system in order to either conduct exhaust gas through the catalyst or conduct the exhaust gas through the control tube past the catalyst in the sense of a bypass operation. In this manner, the exhaust gas after-treatment system can be automatically adapted dependent on the at least one operating condition of the exhaust gas after-treatment system and/or of the at least one operating condition of the engine in order to operate the same either in the catalyst mode or in the bypass mode for the catalyst.

BRIEF DESCRIPTION OF THE DRAWINGS

In the drawings:
Preferred further developments of the invention are obtained from the following description. Exemplary embodiments of the invention are explained in more detail by way of the drawing without being restricted to this. There it shows.

DETAILED DESCRIPTION OF THE PRESENTLY PREFERRED EMBODIMENTS

The invention relates to an exhaust gas after-treatment system of an engine configured as a gas engine or as a dual-fuel engine and to such an engine having a fuel supply system. Further, the invention relates to an engine designed as gas engine or dual-fuel engine and to a method for operating the exhaust gas after-treatment system and the engine.

Figure 1:
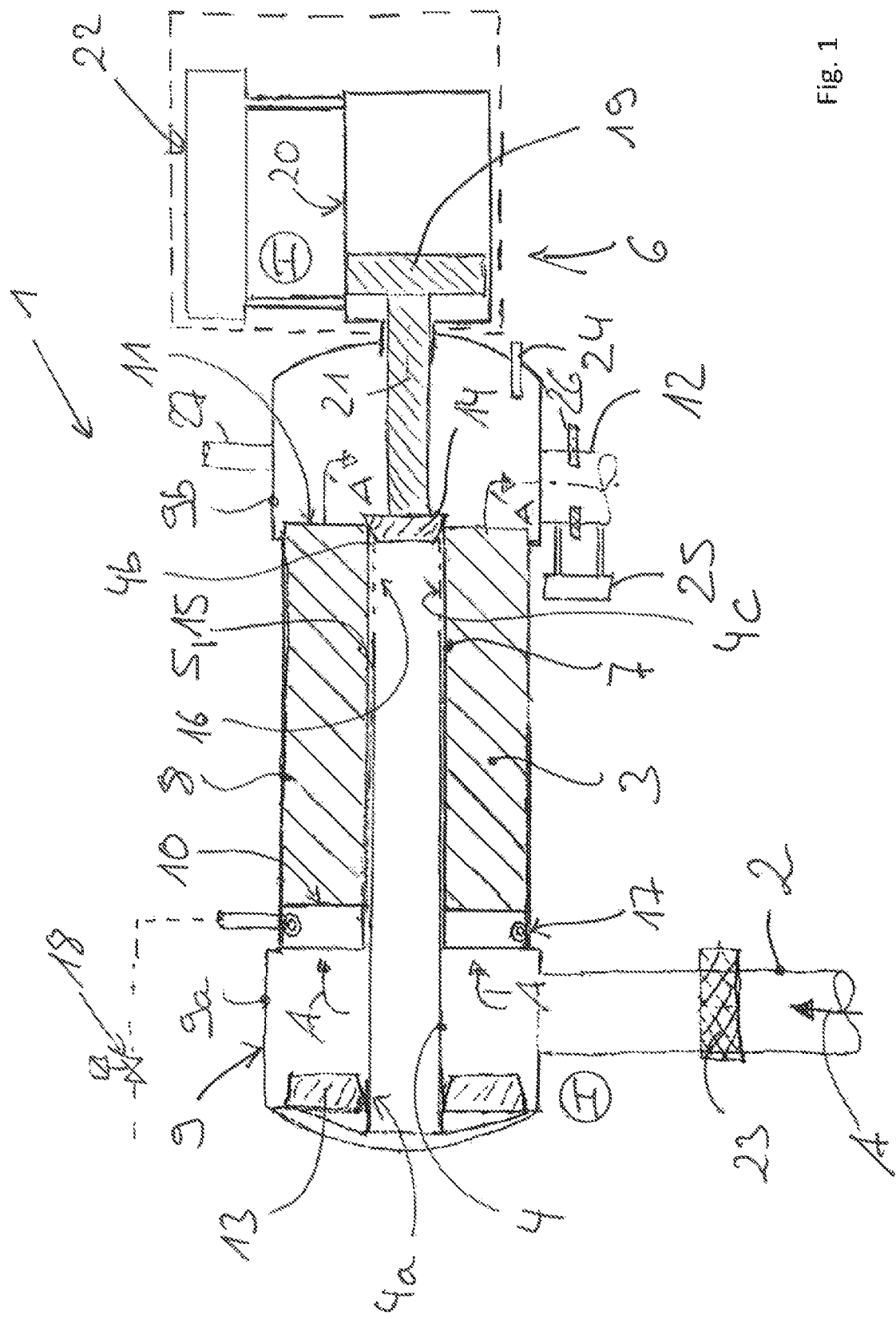
FIG. 1 an exhaust gas after-treatment system according to the invention in a first state.
Figure 2:
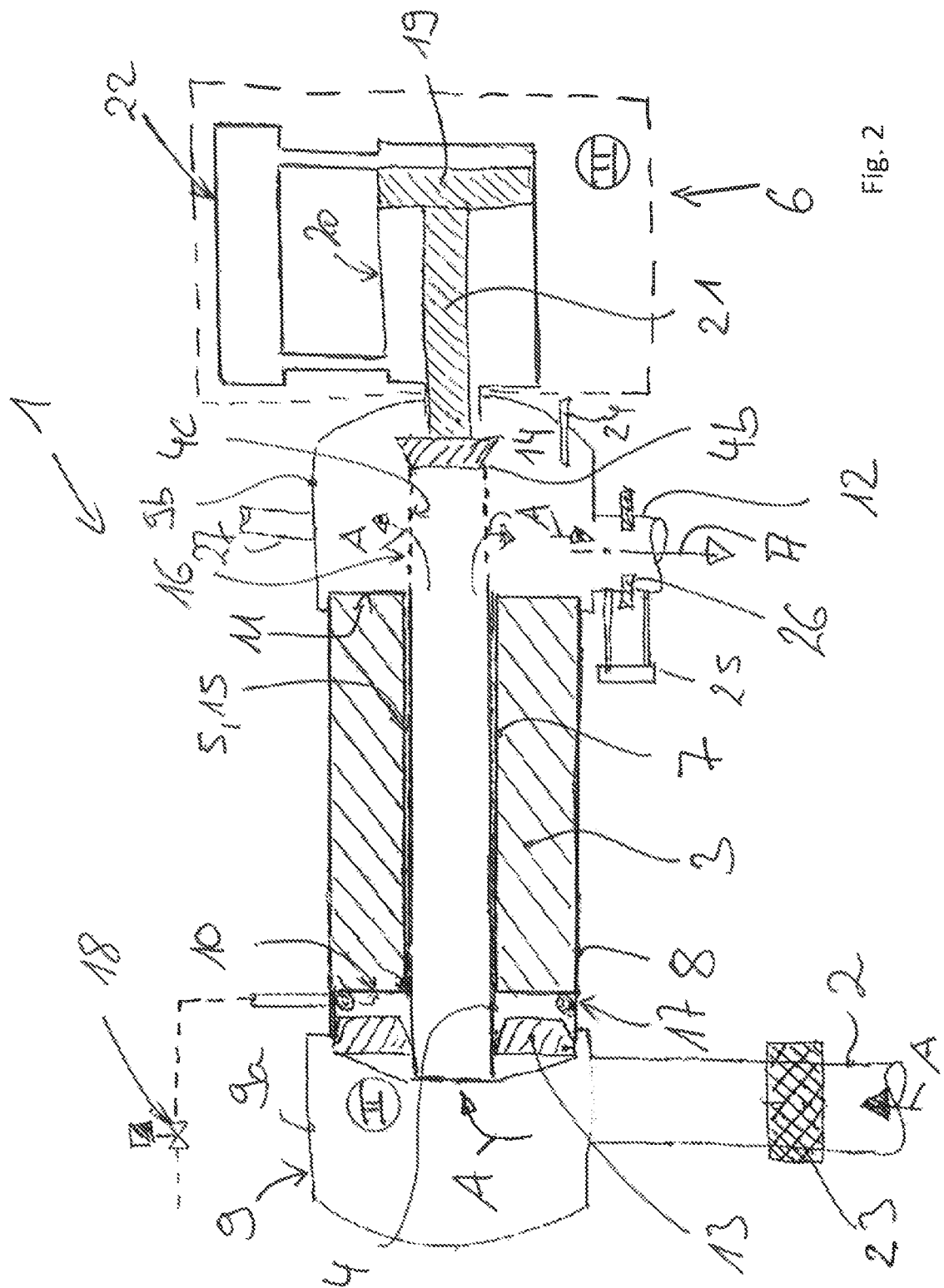
FIG. 2 the exhaust gas after-treatment system of FIG. 1 in a second state.

FIGS. 1 and 2 show, schematically, a preferred exemplary embodiment of an exhaust gas after-treatment system 1 according to the invention of a gas engine or dual-fuel engine which is not shown in more detail, which is in particular a large engine that is employed as propulsion unit on a ship.

FIGS. 1 and 2 show an exhaust line 2 which leads from the engine that is not shown in the direction of the exhaust gas after-treatment system 1.

The exhaust gas after-treatment system 1 is equipped with a catalyst 3. The catalyst 3 can be flowed through by exhaust gas.

Further, the exhaust gas after-treatment system 1 is equipped with a control tube 4, which extends through a recess 5 in the catalyst 3. The control tube 4 is movable relative to the catalyst 3 and likewise be flowed through by exhaust gas. The control tube 4 is guided in the recess 5 of the catalyst 3 so as to be axially movable.

Furthermore, the exhaust gas after-treatment system 1 is equipped with an actuator 6. The actuator 6 is equipped to move the control tube 4 relative to the catalyst 3 dependent on at least one operating condition of the engine and/or dependent on at least one operating condition of the exhaust gas after-treatment system 1.

In a first relative position I (see FIG. 1) of the control tube 4 relative to the catalyst 3, the catalyst 3 can be flowed through by exhaust gas but not the control tube 4.

In a second relative position II (see FIG. 2) of the control tube 4 relative to the catalyst 3, the control tube 4 can be flowed through by exhaust gas but not the catalyst 3.

The catalyst 3 is a ring catalyst. The catalyst 3 is delimited radially inside in the region of the recess 5 receiving the control tube 4 by a first catalyst tube 7. The catalyst 3 is delimited radially outside by a second catalyst tube 8 and/or by a pressure reactor 9. In FIGS. 1 and 2, a portion 9a, 9b of the pressure reactor 9 follows on both axial sides of the catalyst 3 or second catalyst tube 8.

The catalyst 3 has two axial ends located opposite one another. On a first axial end 10 of the catalyst 3 a flow inlet side of the catalyst 3 for exhaust gas is formed. On a second axial end 11 of the catalyst 3 located opposite, a flow outlet side for the exhaust gas is formed.

In particular when the control tube 4 assumes the first relative position relative to the catalyst 3 shown in FIG. 1, exhaust gas A, which flows via the exhaust pipe 2 to the exhaust gas after-treatment system 1, can initially flow into portion 9a of the pressure reactor 9 and from there flow into the catalyst 9 by way of the flow inlet side formed at the first axial end 10. Having flowed through the catalyst 3, the exhaust gas A flows out of the catalyst 3 via the flow outlet side formed at the second axial end 11 located opposite, enters the portion 9b of the pressure reactor 9 and can from this portion 9b flow in the direction of a further exhaust pipe 12, in order to be discharged from the exhaust gas after-treatment system 1.

On a first portion 4a, the control tube 4 comprises a first closure body 13. In the first relative position of the control tube 4 relative to the catalyst 3 (see FIG. 1), this first closure body 13 allows exhaust gas A to flow through the catalyst 3, while accordingly the first closure body 13 in this position opens the flow inlet side of the catalyst 3 formed at the first axial end 10 for the exhaust gas flow. In the second relative position (see FIG. 2) of the control tube 4 by contrast, the first closure body 13 prevents exhaust gas to flow through the catalyst 3, while in this position the first closure body 13 accordingly blocks the flow inlet side of the catalyst 3 formed at the first axial end 10 for the exhaust gas flow. The first portion 4a of the control tube 4, on which the same carries the first closure body 13 radially outside projects at the first axial end 10 of the catalyst 13 relative to the catalyst 3. The first portion 4a of the control tube 4 accordingly projects, at the first axial end 10 of the catalyst 3, from the same.

On a second portion 4b, the control tube 4 comprises a second closure body 14. In the first relative position of the control tube 4 relative to the catalyst 3, this second closure body 14 seals a gap 15 formed between the control tube 4 and the catalyst tube 7 located radially inside. This is not required in the second relative position (see FIG. 2) of the control tube 4 relative to the catalyst 3.

In a third portion 4c, the control tube 4 has recesses 16. In the first relative position (see FIG. 1) of the control tube 4 relative to the catalyst tube 3, these recesses 16 are blocked, in particular via the inner catalyst tube 7 and the second closure body 14. In the second relative position (see FIG. 2) between control tube 4 and catalyst 3 by contrast, these recesses 16 in the third portion 4c of the control tube 4 are open. In the state of FIG. 2, i.e. in particular when the control tube 4 assumes the second relative position relative to the catalyst 3, exhaust gas A, which is fed via the exhaust pipe 2 to the portion 9a of the pressure reactor 9, can flow into the control tube 4 and thus flow past the catalyst 3 in order to then enter via the recesses 16 of the control tube 4 into the second part 9b of the pressure reactor 9 and from their be discharged from the exhaust gas after-treatment system 1 via the exhaust pipe 12.

Furthermore, the exhaust gas after-treatment system 1 is equipped with a sprayer 17 for a regeneration agent. The sprayer 17 is positioned adjacently to the flow inlet end of the catalyst 3 formed at the first axial end 10 of the same, wherein the sprayer 17 can be supplied with reaction agent emanating from a metering valve 18.

The sprayer 17 is preferentially formed as a circular spray tube with the help of which the regeneration agent can be evenly applied to the flow inlet side of the catalyst 3 formed at the first axial end 10.

The actuator 6 of the exhaust gas after-treatment system 1 in the shown exemplary embodiment is equipped with a piston 19 actuated by a pressure medium, which piston 19 is moveably guided in a pressure medium cylinder 20. A piston rod 21, which is operatively connected to the second closure body 14, acts on the said piston 19.

The pressure medium cylinder 20 can be supplied with a pressure medium, emanating from a pressure medium reservoir 22, in order to move the pressure medium piston 19 and, via the pressure medium piston 19, the control tube 4 in the axial direction relative to the catalyst 3.

The exhaust gas after-treatment system 1 is equipped, furthermore, with at least one sensor in order to detect at least one operating condition of the engine and/or at least one operating condition of the exhaust gas after-treatment system.

Accordingly, FIG. 1 shows a sensor 23 which is assigned to the exhaust pipe 2, wherein this sensor 23 is focused on recognising for example engine misfiring. For this purpose, the sensor 23 can be designed for example as temperature sensor which, in particular when fuel is combusted in the engine and then recognises a temperature drop, can then suggest misfiring in the engine.

Furthermore, FIG. 1, 2 shows a temperature sensor 24 in the region of the second portion 9b of the pressure reactor 9 in order to detect the exhaust gas temperature of the exhaust gas flowing out of the catalyst 3.

Furthermore, FIG. 1, 2 shows a pressure sensor 25 which, with a first measuring point upstream of an orifice plate 26, and with a second measuring point downstream of the orifice plate 26, acts on the exhaust pipe 12.

Further, the exhaust gas after-treatment system 1 is equipped with a control device with the help of which the actuator 6 can be controlled as a function of the at least one operating condition of the engine and/or of the at least one operating condition of the exhaust gas after-treatment system in order to move the control tube 4 either into the position shown in FIG. 1 or into the position shown in FIG. 2.

Accordingly, the exhaust gas after-treatment system according to the invention is equipped with the catalyst 3, which is preferentially formed as ring catalyst, the control tube 4 integrated in the catalyst 3, which is movable in the axial direction relative to the control tube 4, and the actuator 6.

Preferentially, the exhaust gas after-treatment system 1 further includes the sprayer 17 for the regeneration agent and at least one sensor 23, 24, 25.

The control tube 4 is moveably arranged in the catalyst 3, namely within the inner catalyst tube 7, and axially moveable via the actuator 6. No absolute tightness of control components is needed. An effective exhaust gas after-treatment can be ensured with little installation space.

The catalyst 3 is designed annular in the cross-section and accordingly is equipped with the recess 5, within which the control tube 4 is guided. Exhaust gas can be conducted past the catalyst 3 by the control tube 4. By way of the exhaust gas conducted via the control tube 4, the catalyst 3 can already be preheated while exhaust gas does not yet flow via the same.

In particular when running up the engine during an engine start, high ignitable residual gas concentrations of the gaseous fuel are present in the exhaust gas. These can then be conducted past the catalyst 3 via the control tube 4 without oxidative reaction in the catalyst 3.

The control tube 4 is moved in the axial direction with the help of the actuator 6. The movement of the control tube 4 can be for example dependent on the exhaust gas pressure and/or the exhaust gas temperature. Temperatures and pressures can be detected by measurement with the help of the sensors 24 and 25.

The control tube 4 carries the closures 13, 14. Depending on the relative position of the control tube 4 relative to the catalyst 3, either the first closure body 13 or the second closure body 14 is effective.

Preferentially, the closure bodies 13, 14 have a conical contour. Because of this conical contour of the closure bodies 13, 14 the same can ensure an effective sealing in their respective closure position without separate seals being required.

The exhaust gas after-treatment system 1 can be supplied with the exhaust gas via the exhaust line 2. Cleaned exhaust gas can be discharged via the exhaust line 12. By way of a further line 27, regeneration agent, in the regeneration mode of the catalyst 3, can be discharged from the exhaust gas after-treatment system 1.

For regenerating the catalyst 3, the exhaust gas after-treatment system 1 comprises the sprayer 17 with the help of which the regeneration agent can be applied to the catalyst 3 in the region of the first axial end 10 and thus in the region of the flow inlet side. In particular, a regeneration of the catalyst 3 is conducted in particular when the catalyst 3 is not flowed through by exhaust gas. Then, an effective regeneration of the catalyst 3 can be ensured with very low quantities of regeneration agent. The regeneration can take place at low temperatures in the catalyst 3. The regeneration can also be conducted with the engine stationary or during other operating states.

The catalyst 3 is preferentially a methane catalyst. Ethanol or ethane or nitrogen is then suitable as regeneration agent.

Furthermore, the invention relates to an engine having the exhaust gas after-treatment system 1 described above and to a method for operating the exhaust gas after-treatment system 1.

In particular when the control tube 4 assumes the first relative position of FIG. 1, exhaust gas is cleaned in the catalyst 3. Accordingly, the control tube 4 assumes this first position of FIG. 1 in the catalyst mode when gaseous fuel is combusted in the engine. Then, the exhaust gas A flows through the catalyst 3 and can be discharged via the exhaust pipe 12. With the help of the temperature sensor 24, a permissible exhaust gas temperature for example can be detected downstream of the exhaust gas catalyst 3. With the help of the pressure sensor 25, an exhaust gas pressure can be detected downstream of the catalyst 3. Dependent on this, the control tube 4 is movable from the relative position of FIG. 1 into the relative position of FIG. 2, wherein the relative position of FIG. 2 corresponds to a catalyst bypass mode, during which no exhaust gas is conducted via the catalyst 3, but the exhaust gas is rather conducted through control tube 4 past the catalyst 3.

The control tube 4 in a dual-fuel engine assumes the relative position of FIG. 2 in particular when the same is operated with liquid fuel, i.e. when diesel fuel is combusted in the engine. Exhaust gas of diesel fuel should not be conducted via a methane catalyst. Furthermore, the exhaust gas after-treatment system, namely the control tube 4 of the same, assumes the relative position of FIG. 2 when the engine is run up during an engine start and/or when the engine is run down during an engine stop, and/or during emergency operation and/or during an engine fault, for example in the case of misfiring, and/or in the case of an exhaust gas overheating.

The invention allows with minimum installation space requirement of the exhaust gas after-treatment system 1 an effective exhaust gas cleaning of the exhaust gas of a gas engine or of a dual-fuel engine operated in the gas fuel operating mode. Existing engines can be readily retrofitted with the help of the exhaust gas after-treatment system 1 according to the invention. The catalyst 3 can be subjected to an effective regeneration with minimum need for regeneration agent.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An exhaust gas after-treatment system (1) of an engine configured as a gas engine or as a dual-fuel engine, comprising:
   a catalyst (3) that can be flowed through by exhaust gas,
   a control tube (4) extending through a recess (5) in the catalyst (3), which control tube (4) is movable relative to the catalyst (3) and which can likewise be flowed through by exhaust gas, wherein the control tube (4) at a first axial end portion (4a) carries a first closure body (13) and carries a second closure body (14) at a second axial end portion (4b) that is opposite the first axial end portion (4a),
   an actuator (6) configured to move the control tube (4) relative to the catalyst (3) depending on at least one operating condition of the engine and/or on at least one operating condition of the exhaust gas after-treatment system such that:
      in a first relative position of the control tube (4) relative to the catalyst (3), the first closure body (13) is axially spaced apart from the catalyst (3) so that the catalyst (3) can be flowed through by exhaust gas but not the control tube (4) and the second closure body (14), seals a gap (15) between the control tube (4) and the catalyst (3), and
      in a second relative position of the control tube (4) relative to the catalyst (3) the first closure body (13) axially seals the catalyst (3) and prevents the catalyst (3) from being flowed through by exhaust gas so that the control tube (4) can be flowed through by exhaust gas but not the catalyst (3) and the second closure body (14), is axially spaced apart from the gap (15) between the control tube (4) and the catalyst (3).

2. The exhaust gas after-treatment system according to claim 1, wherein the catalyst (3) is a ring catalyst which, radially inside, is delimited by a first catalyst tube (7) in the region of the recess (5) receiving the control tube (4), which catalyst tube (7) is delimited radially outside by a second catalyst tube (8) and/or a pressure reactor (9), which, on a first axial end (10), comprises a flow inlet side for exhaust gas and at a second axial end (11) a flow outlet side for exhaust gas.

3. The exhaust gas after-treatment system according to claim 1, wherein the control tube (4), on a third portion (4c) has recesses (16) which, in the first relative position of the control tube (4), are blocked and which, in the second relative position of the control tube (4), are open.

4. The exhaust gas after-treatment system according to claim 3, further comprising a sprayer (17) configured to spray a regeneration agent, via which in the first relative position of the control tube (4) relative to the catalyst (3) and in the second relative position of the control tube (4) relative to the catalyst (3), regeneration agent can be introduced into the catalyst (3).

5. The exhaust gas after-treatment system according to claim 4, further comprising at least one sensor (23, 24, 25) configured to detect the at least one operating condition of the engine and/or the at least one operating condition of the exhaust gas after-treatment system.

6. The exhaust gas after-treatment system according to claim 5, further comprising a controller configured to control the actuator (6) dependent on the at least one operating condition of the engine and/or of the at least one operating condition of the exhaust gas after-treatment system.

7. An engine, configured as one of a gas engine or dual-fuel engine, having an exhaust gas after-treatment system (1) according to claim 1.

8. A method for operating the exhaust gas after-treatment system (1) according to claim 1,
   wherein when in the engine a gaseous fuel is combusted, the control tube (4) has been or is moved into the first relative position relative to the catalyst (3),
   wherein in when in the engine a liquid fuel is combusted, and/or when an engine fault is present, and/or when the engine is started up, and/or when the engine is run down, and/or when exhaust gas overheating is present, and/or when the catalyst is regenerated, the control tube (4) has been or is moved into the second relative position relative to the catalyst (3).

9. The exhaust gas after-treatment system according to claim 1, wherein in the second relative position of the control tube (4) relative to the catalyst (3) the first closure body (13) seals a first axial end of the catalyst (3) to prevent the exhaust gas to flow through the catalyst (3).

\* \* \* \* \*